United States Patent [19]
Sanchez

[11] Patent Number: 4,621,801
[45] Date of Patent: Nov. 11, 1986

[54] DOCUMENT EDGE REGISTRATION SYSTEM

[75] Inventor: Hector J. Sanchez, Webster, N.Y.

[73] Assignee: Xerox Corporation, Stamford, Conn.

[21] Appl. No.: 678,859

[22] Filed: Dec. 6, 1984

[51] Int. Cl.⁴ .............................................. B65H 9/16
[52] U.S. Cl. .................................... 271/251; 271/248; 400/633
[58] Field of Search ................. 271/251, 248, 94, 250, 271/252, 253; 355/3 SH, 14 SH; 400/633

[56] References Cited

U.S. PATENT DOCUMENTS

| 3,762,700 | 10/1973 | Peterson et al. | 271/252 X |
|---|---|---|---|
| 3,908,986 | 9/1975 | Bleau | 271/227 |
| 4,179,117 | 12/1979 | Rhodes, Jr. | 271/251 |
| 4,257,587 | 3/1981 | Smith | 271/236 |
| 4,266,762 | 5/1981 | Kramer et al. | 271/225 |
| 4,285,512 | 8/1981 | Shlatz | 271/233 |
| 4,316,667 | 2/1982 | Edwards et al. | 355/3 SH |
| 4,335,954 | 6/1982 | Phelps | 355/14 |
| 4,366,219 | 12/1982 | Beery | 355/14 SH X |
| 4,381,893 | 5/1983 | Silverberg | 355/3 SH |
| 4,411,418 | 10/1983 | Poehlein | 271/236 |
| 4,432,541 | 2/1984 | Clark et al. | 271/251 |
| 4,456,237 | 6/1984 | Buddendeck | 271/3.1 |
| 4,462,527 | 7/1984 | Taylor et al. | 226/15 |

FOREIGN PATENT DOCUMENTS

111681  7/1982  Japan .................................. 271/251

Primary Examiner—Duane A. Reger
Assistant Examiner—Matthew C. Graham

[57] ABSTRACT

A document feeder for feeding a document sheet in a document feeding path downstream to a registered copying position on the platen of a copier, with deskewing and edge registration (document registration transverse the direction of the document feeding path to the platen) upstream of the platen, with a skewed roller edge registration system for feeding the document transversely as well as downstream, and wherein a large radius non-skewed arcuate document guide path provides an arcuate document deforming portion of the document feeding path, the improvement wherein an arcuate document edge confinement and control is provided along the edge of the arcuate document guide path, preferably by a document edge guide having a narrow and smooth-bottomed arcuate slot adapted to receive, confine closely, and edge register the document therein, sliding it along the bottom of the slot, and the skewed rollers are mounted in and intermediately of the arcuate document guide path for providing both edge registration and deskewing of a document therein by transverse movement of the document into alignment with the document edge guide while the document is arcuately deformed in both the arcuate docment guide path and the document edge guide, and another document feeder is provided for feeding the document into the arcuate document guide path and into the skewed rollers with a system for automatically preventing interference with the transverse movement of the document by the skewed rollers.

6 Claims, 4 Drawing Figures

DOCUMENT EDGE REGISTRATION SYSTEM

The present invention relates to a document handling system and more particularly relates to an improved method and apparatus for automatically feeding and edge registering individual document sheets to be copied on a copier platen.

As xerographic and other copiers increase in speed, and become more automatic, it is increasingly important to provide higher speed yet more reliable and more automatic handling of the document sheets being copied, i.e. the input to the copier. It is desirable to feed, accurately register, and copy document sheets of a variety or mixture of sizes, types, weights, materials, conditions and susceptibility to damage, yet with minimal document jamming, wear or damage by the document transporting and registration apparatus, even if the same documents are automatically fed and registered repeatedly, as for recirculating document precollation copying.

Even with slower copying rate copiers, it has become increasingly desirable to provide at least semi-automatic document handling (SADH), allowing an operator to "stream feed" originals into an input of the copier document handler or feeder, or to provide an automatic document handler (ADH) for automatic feeding from a stack of documents, with the document feeder in either case doing the deskewing, feeding and final registration of the documents into the copying position, and then ejecting the documents from the platen automatically.

A preferable document handling system in one that utilizes an existing or generally conventional copier optical imaging system, including the external transparent copying window (known as the platen or imaging station) of the copier. It is also desirable that the document handling system be readily removable, as by pivoting away, to alternatively allow the copier operator to conventionally manually place documents, including books, on the same copying platen. Thus, a lighter weight document handler is desirable. It is also desirable that a document registration edge alignment or positioning system be available for such manual copying which is compatible with that used for the document handler.

In the description herein the term "document" or "sheet" refers to a usually flimsy sheet of paper, plastic, or other such conventional individual image substrate, and not to microfilm or electronic images which are generally much easier to manipulate. A highly elongate document or copying substrate such as a computer form (CF) plural section web, known as fanfold or zig-zag, is referred to herein as a "web" or "CF". The "document" is the sheet (original or previous copy) being copied in the copier onto the "copy sheet", which may be abbreviated as the "copy". Related, e.g. page order, plural sheets of documents or copies are referred to as a "set", or book. A "simplex" document or copy sheet is one having its image and page number on only one side or face of the sheet, whereas a "duplex" document or copy sheet has pages and normally images on both sides.

The present invention is particularly suitable for pre-collation copying, i.e. automatically plurally recirculated document set copying provided by a recirculating document handling system or "RDH". However, the disclosed system is also compatible with non-precollation or post-collation copying, such as semi-automatic document handling (SADH) as discussed above. Pre-collation, collation, recirculative, or RDH copying, as it is variably called, is a known desirable feature for a copier. It provides a number of important known advantages. In such precollation copying any desired number of callated copy sets or books may be made by making a corresponding number of recirculations of the set of documents in collated order past the copier imaging station and copying each document page (normally only once) each time it circulates over the imaging station. The copies therefrom may automatically exit the copier processor in proper order for stacking and offsetting as precollated sets, and thus do not require subsequent collation in a sorter or collator. On-line finishing (stapling, stacking and/or glueing, or other binding) and/or removal of completed copy sets may thus be provided while further copy sets are being made in further circulations of the same document set.

Some current examples of recirculating document handlers are disclosed in U.S. Pat. Nos. 4,076,408; 4,176,945; 4,278,344; 4,330,197, 4,466,733 and 4,428,667. A preferred vacuum corrugating feeder air knife, and a tray, for an RDH are disclosed in U.S. Pat. Nos. 4,418,905 and 4,462,586. An integral semi-automatic and computer form feeder (SADH/CFF), which may be an integral part of an RDH, as noted in Col 2, paragraph 2, therein, is disclosed in U.S. Pat. No. 4,462,527.

However, a disadvantage of such precollation copy systems is that the documents must all be repeatedly separated and circulated sequentially for copying in a predetermined order a number of times equivalent to the desired number of copy sets. Thus, increased document handling is necessitated for a precollation copying system, as compared to a post-collation copying system. Therefore, maximizing document handling automation while minimizing document wear or damage is particularly important in precollation copying.

In contrast, in a post-collation copying system, such as with an ADH or SADH, plural copies may be made at one time from each document page and collated by being placed in separate sorter bins. Thus, the document set need only be circulated (or manually or semi-automatically fed) to the imaging station once if the number of copy sets being made in less than the number of available sorter bins. A disadvantage is that the number of copy sets which can be made in one document set circulation is limited by the number of available sorter bins. Also, a sorter adds space and complexity and is not well suited for on-line finishing. However, post-collation copying, or even manual document placement, is desirable in certain copying situations to minimize document handling, particularly for delicate, valuable, thick or irregular documents, or for a very large number of copy sets. Thus, it is desirable that a document handler for a precollation copying system be compatible with, and alternatively usable for, post-collation and manual copying as well.

Although faster, more accurate, and automatic feeding into and registration of each document at the correct position on the platen to be copied in highly desired, this is difficult to accomplish without skewing (rotating) the document and/or damaging the edge of the document, particularly as it is being stopped. One problem is that documents can vary widely in sheet size, weight, thickness, material, condition, humidity, age, etc.. Documents may even have curls, wrinkles, tears, "dog-ears", cut-outs, overlays, tape, paste-ups, punched holes, staples, adhesive or slippery areas, or other irregularities. Unlike sets of copy sheets, which generally are all from the same new clean batches and therefore of almost exactly the same condition and size, documents often vary considerably even is they are all of the same "standard" size, (e.g. letter size, legal size, A-4, B-4, etc.). In contrast documents even in the same set may have come from completely different paper batches or have variably changed size with different age or humidity conditions, etc.. Furthermore, the images on documents and their fusing can change the sheet feeding characteristics and these images may be subject to damage in feeding if not properly handled, e.g. smearing of fresh typewriting ink. Yet it is desirable to automatically or semi-automatically rapidly feed, register and copy even a mixture of sizes, types, and conditions of documents without document jams or document damage and with each document correctly and accurately aligned to a desired registration position.

One of the most difficult to achieve features for automatic document handling is the rapid, accurate, reliable, and safe registration of each document at the proper position for copying. Conventionally the document is desirably either center registered or corner registered (depending on the copier) by the document handler automatically at a pre-set registration position relative to the copier platen. At this registration position two orthogonal edges of the document are aligned with two physical or positional (imaginary) registration lines of the copier platen at which the original document is properly aligned with the copier optics and copy sheet/photoreceptor registration system for correct image transfer of the document image to the photoreceptor and then to the copy sheet. This registration accuracy is desirably consistently within approximately one millimeter. If the document is not properly registered, then undesirable dark borders and/or edge shadow images may appear on the ensuing copy sheet, or information near an edge of the document may be lost, i.e. not copied onto the copy sheet. Document misregistration, especially skewing, can also adversely affect further feeding and/or restacking of the documents.

In preferred types of copying systems the document is registered for copying overlying a selected portion of a full sized (full frame) platen which is at least as large as the largest document to be normally copied automatically. In such systems the document is preferably either scanned or flashed while it is held stationary on the platen in the desired registration position. That is, in these full frame systems the document is preferably registered by being stopped and held during imaging at a preset position over the platen glass which is adjacent one side or edge thereof.

As shown in the art, and further discussed below, document handling systems have been provided with various document transports to move the documents over the copier platen and into registration. Such document platen transports may comprise single or plural transport belts or feed wheels, utilizing frictional, vacuum, or electrostatic sheet driving forces. Various combinations of such transports are known with various registration devices or systems. Preferably the same platen transport sheet feeder is used to drive a document onto and off of the platen before and after copying as well as registering the document.

The cited art shows several approaches to registering a document for copying at an appropriate position relative to the transparent copying window. Typically the document is registered on one axis by driving it with a platen transport against a mechanical gate or stop positioned temporarily or permanently at or adjacent or edge of the platen. Typically this is at or closely adjacent the downstream edge of the platen.

That allows unidirectional movement of the document across the platen, entering from the upstream side or edge closely following the proceeding document and ejecting after copying from the downstream side or edge of the platen. The registration gate or stop may comprise projecting aligned fingers, or roller nips, or a single vertical surface along one registration line, against which an edge of the sheet, normally the leading edge, is driven into abutment to mechanically or "hard" stop, and thereby register, the sheet on one axis, i.e. in its principal direction of movement. Another function of such mechanical registration is to also deskew the document, i.e., to properly rotate and align it with this registration line as well as to determine and control its registration position.

In some document handling systems a system for also side registering (laterally positioning) the document on the platen is used, i.e. aligning the original on both axes while on the platen, e.g. U.S. Pat. Nos. 4,411,418 or 4,335,954. However two axes on-platen registration is not normal, and in fact such lateral or second axis registration is preferably done upstream of the platen. The present system desirably provides this. Prior systems have utilized planar confinement of the documents within the planar side guides in the document tray from which the documents are fed, or driving of the sheet against one side guide, or the like, e.g. U.S. Pat. Nos. 3,908,986; 4,179,117; 4,257,587; 4,411,418; 4,266,762; 4,285,512; 4,316,667 (note especially FIG. 5); 4,381,893; 4,432,541. Said U.S. Pat. No. 4,179,117 is particularly noted for its skewed frictional wheel said registration drive. Also, U.S. Pat. No. 4,462,527 issued July 31, 1984 to T. N. Taylor, et al.

Side or lateral registration *and side edge deskewing* of the document is highly desirable, particularly to avoid having to use mechanical lead edge hard-stop deskewing. However, heretofore doing so reliably, simply and accurately had presented difficulties, especially for thin documents.

By way of further background, a severe limitation on over-platen document transport and registering systems is that they must reliably feed the document without any uncontrolled document slippage or skewing, but must be able to move relative to the platen glass when no document sheet is therebetween without scratching or wearing the glass such that imaging through the glass is affected. Even more difficult, where mechanical registration stops are used, the platen transport must inconsistently provide intentional, controlled, slip relative to the document briefly while the document is being stopped by the mechanical registration stop so that the document is not overdriven (crumpled) against the stop and so that the document is free to deskew by rotating relative to the transport.

Likewise the over-platen transport should not cause "show around" or "show-through" problems—i.e. undesirable dark areas or images of the transport on the copy sheet seen by the copier optics around a document or through a translucent document. Show-around is a particular problem with undersized documents or reduced images of documents, where uncovered portions of the document transport (extending beyond the document edges) are exposed during copying. If the platen transport has dark areas or shadowforming recesses, apertures or gaps, especially in these exposed areas, they can print out on the copy. This show-around and show-through problem has led to the desirability and use of single large while elastomeric belts for many document handlers in lieu of rollers or multiple belts, to provide a uniformly light reflective background behind and around the document.

However, such single belt systems have some inherent compromises in feeding and registration reliability when slip must be provided between the document and the belt for a mechanical stop type of document registration, as discussed above. This is further discussed and disclosed, for example, in U.S. Pat. No. 4,353,541 filed Sept. 24, 1980 by W. J. Parzygnat and the other art therein and here. As noted, such limitations or compromises are inherent in a document feeding system which desires to minimize document slip and skewing in feeding from the document set stack to the registration position on the platen, yet which desires to allow document slip and deskewing during the document registration, i.e. to allow the document to slip and rotate as it is being driven into alignment with a mechanical registration edge. It is also generally undesirable to have significant edge drag on documents, since that can induce skewing, so edge-guide document contact in the document path is not normally considered desirable for skew-prevention or otherwise.

Retractable mechanical document registration stops have additional disadvantages. The retractable registration gate fingers may have timing or positioning difficulties in preventing escape or slippage of the document, particularly for uniform single belts and for certain document weights and conditions. Also, if a document is stopped by only one registration finger it can become skewed. Misregistration can cause image loss, edge or background copy defects, and serious problems in the further transporting of the document. Document registration slilppage can cause wrinkling, abrasion, or tearing of the document, especially if it is driven over raised fingers by the document belt. Additionally, in a movable registration gate there is typically an inherent small gap between the registration gate and the edge of the platen. The edge of the platen glass is typically beveled to allow the registration gate to slide up and down over the platen edge at a desired acute angle relative to the upper surface of the platen, as in U.S. Pat. No. 3,844,552, for example. Thus the document lead edge, particularly if it is downwardly curled, can become caught in any gap or space between the registration gate and this edge of the platen and pulled downwardly therebetween as the registration gate is retracted (which occurs shortly before the document is to be driven off the platen).

A registration system requiring reversal of the driving direction of the platen transport is less desirable. Besides the added complexity and cost and time losses, a reversed drive system inherently has backlash, inertial resistance, and component tensioning reversals, all of which can induce positional errors. Further, rapid reversal may cause document slippage. Thus a unidirectional platen transport, as provided here, is greatly preferred.

Since, as discussed above, any mechanical or "hard" stopping of the document edge against a mechanical edge, finger or gate is undesirable, other systems have been developed. As disclosed, for example, in U.S. Pat. Nos. 4,043,665 issued Aug. 23, 1977 to J. R. Caldwell; U.S. Pat. No. 4,132,401 issued Jan. 2, 1979 to J. F. Gauranski, et at; or U.S. Pat. Nos. 4,295,737 or 4,391,505 issued Oct. 20, 1981 and July 5, 1983 to Morton Silverberg, document registration can desirably be done without mechanical document stops on the platen. This can be done by pre-registering the document to a platen transport belt with upstream, off-platen, pre-registration fingers or rollers, and then moving the document a known, preset, distance over the platen on the belt into registration, providing there is no slippage during this entire movement between the document and the belt. Alternatively, this can be done by sensing, on the platen or upstream of the platen, with a document edge sensor, the edge of a document being transported onto the platen and then stopping the document platen transport then or after a preset time period or movement to stop the document on the platen. Off-platen document edge sensing (see below) is preferred, since reliable onplaten sensing is more difficult and generally requires special sensors and platen transport modifications or adaptations such as disclosed in said U.S. Pat. No. 4,391,505 and in U.S. Pat. No. 3,473,035 and U.S. Pat. No. 3,674,363. Thus, particularly noted in U.S. Pat. No. 3,674,363 to E. O. Baller et al, issued July 4, 1972, e. g. Cols. 8 and 9, second paragraph, and Col. 10, first paragraph, disclosing sensing the document trail edge upstream of the platen to initiate slowdown and stopping of the platen transport. Said U.S. Pat. No. 3,473,035, issued Oct. 14, 1969 to J. F. Gardner, is particularly noted as to SW1 in FIG. 7 and its description re operator selectable document stopping/shifted imaging positions.

Noted as recent art disclosing a servo controlled document sheet transport controlled by a document sheet trail edge sensor to allegedly provide controlled document registration at any point on the platen in IBM Corporation U.S. Pat. No. 4,455,018 issued June 19, 1984 to Donald F. Colglazier et al.

Examples of Xerox Corporation U.S. Patents on servo-motor or stepper-motor driven original document feeders in general are U.S. Pat. Nos. 3,888,579; 4,000,943, 4,144,550 and 4,283,773.

The following additional references also apparently sense a document sheet trailing edge as the reference time for initiating a control "count" or fixed distance drive for controlling the document sheet feeding drive on the copier platen: IBM Tech. Discl. Vol. 19, No. 5, Oct. 1976, pp. 1589-1591, and 3,829,083 and 3,936,041, to Shiina et al (Ricoh), and U.S. Pat. No. 4,066,255 issued Jan. 3, 1978 to W. F. Bradbury (Addressograph-Multigraph Corp.).

Further noted in this regard are Xerox Disclosure Journal publications Vol. 2, No. 3, May/June 1977, p. 49, and Vol. 3, No. 2, March/April 1978, pp. 123-124. The latter, however, teaches lead edge document sensing and (undesirable) document transport reversal, and states that "Trail edge document sensing is not desirable, particularly for an undersized document, where the desired registration edge is at the downstream side of the platen."

Of particular interest is U.S. Pat. No. 4,456,237 issued June 26, 1984 to M. H. Buddendeck, particularly for its disclosure of an RDH with a solenoid (56) opened document feed roll set (48) nip to provide for optional document reversal by reversible rollers 30 in an RDH document path.

U.S. Pat. No. 4,391,504 issued July 5, 1983 to T. Acquaviva discloses that documents loaded in an RDH tray for recirculative copying may be ejected from the RDH rather than returned to that tray in special cases.

Relating to recent art on variable document imaging (stopping) positions on the platen, specifically for shifting the image position relative to the copy sheet, as for variable copy sheet second side (duplex) margins, are: U.S. Pat. Nos. 4,422,751 issued Dec. 27, 1983 to Kutaka Komiya (Canon), and related U.S. Pat. Nos. 4,187,024 and 4,272,180 (Ricoh), e.g. Col. 7, middle, FIGS. 9 and 10 and Col. 6, lines 29–45, Col. 4, line 29 to Col. 5, line 17, and Claims 5 and 9 of U.S. Pat. No. 4,187,024 only.

Of further interest re imaging of a document at different document transport positions for different magnifications, is Xerox Corp. U.S. Pat. No. 4,029,411 issued June 14, 1977 to Denis Stemmle.

Of interest re a different function is U.S. Pat. No. 4,351,606 issued Sept. 28, 1982 to E. B. Franko (Xerox Corp.) in which a signal from sensors indicating the size of the copy sheets is compared with a signal from sensors indicating the size of the original documents being copied to generate a signal indicative of the difference therebetween which is used to adjust the copying magnification (reduction).

Further, U.S. Pat. No. 3,689,143 issued Sept. 5, 1972 to R. D. Case et al (Xerox Corp.) teaches a plurality of sensing devices positioned to detect the size of the original document to be copied as it is inserted. This information is translated into copier machine logic to select a particular optical magnification, document speed and copy sheet tray (copy sheet size). A document width or transverse dimension detector is disclosed in U.S. Pat. No. 4,465,271 issued Aug. 14, 1984 to T. Saitoh, et al (FX).

Also noted re automatic variable optical magnification control or mismatch detection in response to sensing both the selected document and copy sheet dimensions and the magnification ratio is U.S. Pat. No. 4,277,163 issued July 7, 1981 to M. Ikesue et al (Ricoh) and U.S. Pat. No. 4,406,537 issued Sept. 27, 1983 to G. Mori (Ricoh).

The present system is not limited to any particular or specific type of document illumination or optics system, and is applicable to, for example, either scanning or stationary optics (flash illumination) copying, and variable magnification or reduction, e.g. U.S. Pat. No. 4,336,995, FIG. 3, or U.S. Pat. No. 4,466,734, respectively.

Some examples of various other patents generally teaching known copier document handlers and copiers and control systems therefor, including document and paper path switches and counters, are U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270, 4,335,949 and 4,428,666. Conventional simple software instructions in a copier's conventional microprocessor logic circuitry and software of document handler and copier control functions and logic, as taught by the above and other patents and various commercial copiers, are well known and preferred. However, it will be appreciated that the functions and controls described herein may be alternatively conventionally incorporated into a copier utilizing any other suitable or known simple software or hard wired logic systems, switch controllers, etc.. Suitable software for functions illustrated or described herein may vary depending on the particular microprocessor or microcomputer system utilized, of course, but will be already available to or readily programmable by those skilled in the art without experimentation from the descriptions and references provided herein.

As shown in the above-cited art, the control of exemplary document and copy sheet handling systems in copiers may be accomplished by conventionally actuating them by signals from the copier controller directly or indirectly in response to simple programmed commands and from selected actuation or non-actuation of conventional copier switch inputs by the copier operator, such as switches selecting the number of copies to be made in that run, selecting simplex or duplex copying, selecting whether the documents are simplex or duplex, selecting a copy sheet supply tray, etc.. The resultant controller signals may conventionally actuate various conventional electrical solenoid or cam controlled sheet deflector fingers, motors or clutches in the copier in the selected steps or sequences as programmed. Conventional sheet path sensors, switches and bail bars, connected to the controller, may be utilized for sensing and timing the positions of documents and copy sheets, as is well known in the art, and taught in the above and other patents and products. Copying systems utilize such conventional microprocessor control circuitry with such connecting switches and sensors for counting and comparing the numbers of document and copy sheets as they are fed and circulated, keeping track of their general positions, counting the number of completed document set circulations and completed copies, etc. and thereby controlling the operation of the document and copy sheet feeders and inverters, etc., It is a great feature of the system disclosed herein to overcome various of the disadvantages and limitations discussed above and in the cited references.

The present system can provide uncompromised non-slip, non-skewing, over-platen feeding because in this system registration does not require slip or skewing of the document relative to the document platen transport and does not require mechanical document stops in the document path. Deskewing is done by and with edge registration of the document side edge upstream of the platen.

A specific feature disclosed herein is to provide, in a document feeder for feeding a document sheet in a document feeding path downstream to a registered copying position on the platen of a copier, with deskewing and edge registration (document registration transverse the direction of the document feeding path to the platen) upstream of the platen with skewed roller edge registration means for feeding the document transversely as well as downstream, and wherein large radius non-skewed arcuate document guide path means provide an arcuate document deforming portion in said document feeding path to the platen, the improvement wherein:

arcuate document edge confinement and control means are provided along the edge of said arcuate document guide path means, said skewed roller edge registration means is mounted in and intermediately of said arcuate document guide path means for providing both edge registration and deskewing of a document therein by transverse movement of the document into alignment with said document edge confinement and control means while the document is arcuately deformed in both said arcuate document guide path means and said document edge confinement and control means, and document feeding means are provided for feeding the document into said arcuate document guide path means and into said skewed roller edge registration means, said document feeding means includes means for preventing interference with said transverse movement of the document by said skewed roller edge registration means.

Another disclosed feature is, in the method of feeding a document sheet in a document feeding path downstream to the platen of a copier, with edge registration and deskewing of the document upstream of the platen by transverse movement of the document (movement transverse the downstream direction of the document feeding path to the platen) and wherein a large radius non-skewing arcuate document guide path is provided in the document feeding path to the platen, the improvement comprising: providing said edge registration transverse movement of the document while the document is arcuately deformed in said arcuate document guide path, and doing so by driving the document transversely to said document feeding path into a closely confining document edge guide while one edge of the document is closely confined to said arcuate document guide path by said closely confining document edge guide, and feeding the document into said arcuate document guide path from upstream thereof so as not to interfere with said transverse side registration movement of the document in said arcuate document guide path;

wherein said edge registration is provided by driving one edge of the document fully into and slidably along the bottom of a narrow arcuate slot defining one edge of said arcuate document guide path, said slot providing said closely confining edge guide; and wherein said edge registration transverse movement is provided by a frictional drive wheel rotatably driven adjacent said slot and skewed at a slight angle towards said bottom of said slot.

Further features which may be provided by the method and apparatus disclosed herein include wherein said arcuate document edge confinement and control means comprises a document edge guide having a narrow and smooth-bottomed arcuate slot adapted to receive, confine closely, and edge register therein, along said bottom of said slot, one edge of the document, and wherein said skewed roller edge registration means is positioned closely adjacent said slot and adapted to feed said one edge of the document transversely fully into said slot and also downstream in said slot slidably along said bottom thereof; wherein said document feeding means comprises at least one normally closed document feed roller pair nip upstream of said arcuate document guide path means, and wherein said means for preventing interference comprises means for automatically opening said nip after a document fed thereby has been fed into said skewed roller document edge registration means, said document feeding means being adapted to only partially feed the document into said edge confinement and control means; wherein said skewed roller edge registration means comprises a relatively high friction rotatably driven roller mounted adjacent one edge of said document path and skewed at a small angle towards said edge and a low friction roller forming a document feeding nip with said high friction roller and skewed away from said edge; and wherein said slot is generally hemi-cylindrical and has a width perpendicular said document feeding path of less than approximately one-half centimeter.

All references cited herein, and their references, are incorporated by reference herein for appropriate teachings of additional or alternative details, features, and/or technical background.

Various of the above-mentioned and further features and advantages will be apparent from, but are not limited to, the following specific example of one application of the invention. The following description of this exemplary embodiment includes drawing figures (approximately to scale) wherein.

Figure 1:
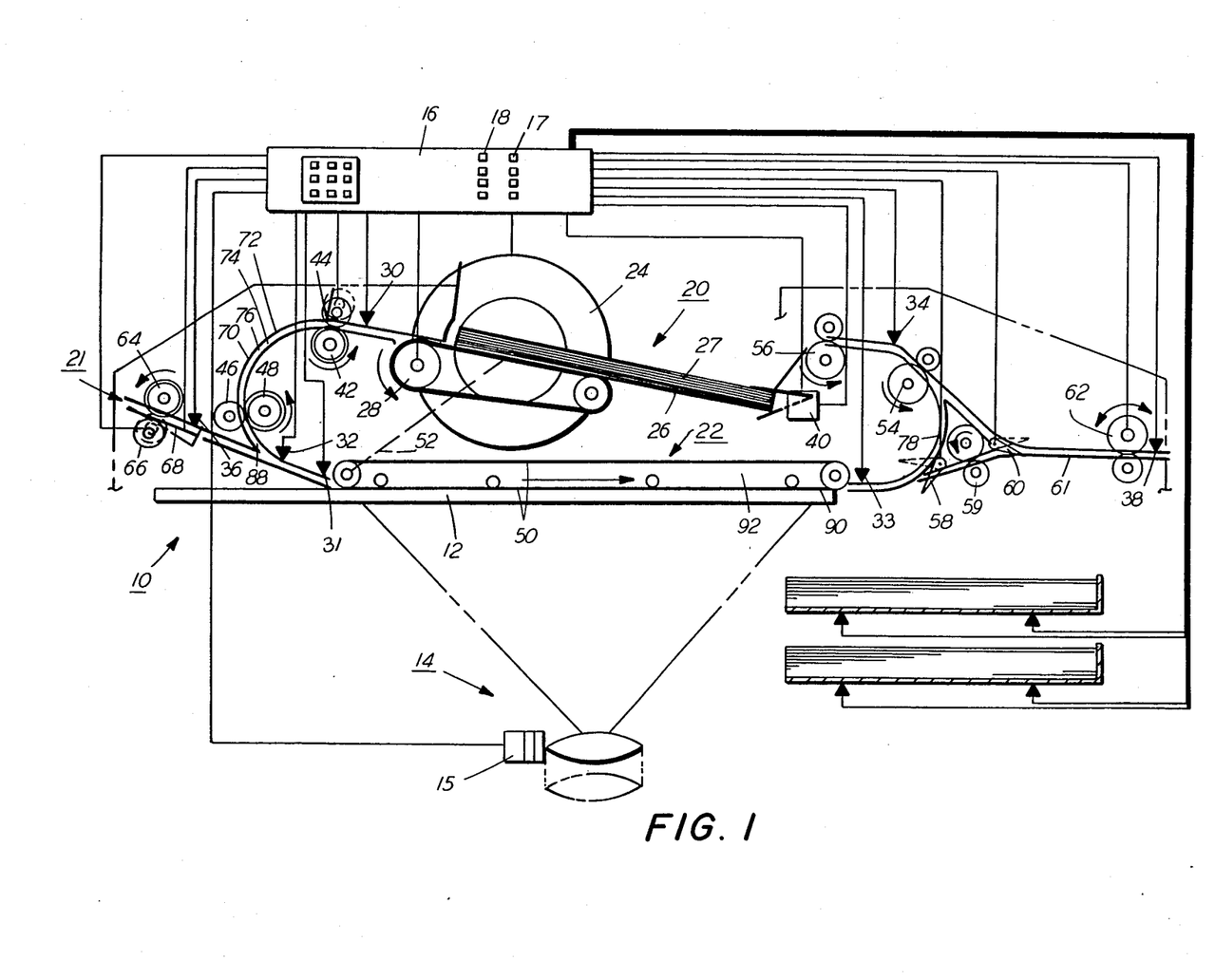
FIG. 1 is a partly schematic side view of an exemplary recirculating document handler incorporating one example of the present invention.

Referring to the one example of FIGS. 1-4, and in particular FIG. 1, it will be appreciated that the system described herein may be utilized with various document handlers and copiers, such as those incorporated by reference herein. Thus while the connecting portion of an exemplary copier 10 here comprises the illustrated copier platen 12 and a simple full-frame optics system 14, it will be appreciated that the disclosed registration system may be utilized, for example, with a scanning optics system, as previously noted. The optics system 14 is one example of an optics system providing variable magnification of the document image of the platen 12 onto a selected copy sheet. This includes at least two or more selectable choices of reduction, so as to be able to copy for example, legal size documents onto letter size copy sheets, and the like, as is well known per se. Preferably, but not necessarily, this choice of reductions is continuous over a substantial range so as to provide a wide variety of reduction selections. Additionally, but not necessarily, one or more choices of document image enlargement may be provided by the optic system 14. The mechanisms for providing such optical reduction or magnification changes, by lens, mirror and/or platen repositioning, are well known in the art, and are disclosed in references cited above, and need not be described herein. The operator selection of the desired reduction or magnification of the document image is conventionally made on the operator console (keyboard) of the copier controller 16. Illustrated here are selectable magnification/ reduction switches or buttons 17 on the operator console which connect with and control the conventional programmable copier controller 16 as previously described above. Actuation of a selected magnification or reduction switch 17 accomplishes that change and also provides a control signal in the controller 16 indicative of that selected magnification or reduction ratio. Alternatively or additionally, a lens or mirror position encoder 15 may be provided connecting with or directly sensing the movement of the optical elements of the optical system 14 to provide signals indicative of the actual repositioning of the optical elements and therefore of the actual present reduction or magnification ratio of the optical system 14.

Also connecting with the controller 16 are copy tray selector switches 18. Where different size copy sheets are placed in different copy trays or cassettes, as is conventional, the selection of a particular switch 18 provides a signal to the controller indicative of the size of the copy sheet onto which the document image is being copied. Alternatively or additionally, as shown in the lower right-hand side of FIG. 1, actual sheet size sensors may be placed in the individual copy sheet trays or in the paths of the copy sheets being fed from these copy sheet trays to directly measure the actual copy sheet size, which sensors are connected to the controller 16, as shown, to provide signals directly indicative of the copy sheet size being utilized for that particular copy (note the above-cited art references in this regard).

Thus, it may be seen that the controller 16 is provided with signals indicative of both the size of the copy sheet being utilized and also the ratio of the optical reduction or magnification of the document image onto that copy sheet. As will be fully further described herein, both of these signals are utilized for document registration. This inputted electrical signal information as to the copy paper size and the selected magnification or reduction ratio is combined with other information to calculate the proper document imaging position on the platen as a function of both said inputs. This is combined with information as to the sensed timing/position of the trail edge of the specific document sheet being copied as it is fed onto the imaging platen 12. A calculated variable stopping position of the document is provided which eliminates any need for the document to hit a mechanical registration stop, i.e. it completely avoids "hard stop" driving of the document sheet into a mechanical registration edge or gate.

First, however, the exemplary RDH/SADH system 20 disclosed here will be described in further detail. It includes an alternate SADH input 21 into which individual document sheets or computer form (fanfold) web may be fed for copying. This SADH mode utilizes the same platen document transport 22 and its drive (comprising a servo motor 24 with encoder) and other components shared with the RDH mode of operation of this document handler 20. For the RDH mode, i.e. for recirculating (precollation) document copying, the set of original documents 27 are stacked face-up into the document tray 26. They are sequentially fed out from the bottom of the stack by a vacuum corrugating feeder 28, as described in above-cited references.

The RDH/SADH unit 20 may be alternately utilized as a nonrecirculating automatic document feeder (ADF) by placing the documents in tray 26 but not returning them to the tray 26 after copying. Preferably such an ADF would utilize a top feeder, i.e. the bottom feeder 28 would be removed or inactivated for ADF top sheet document feeder could be, for example, a simple "flapper" feeder utilizing plural sheet feeding flappers of the type disclosed in U.S. patent application Ser. No. 627,269 filed July 2, 1984 by G. M. Garavuso, et al (D/84049), commonly mounted and rotatably driven on a single shaft adjacent the top front edge of tray 26.

Additionally connected to the controller 16 are document sheet lead and/or trail edge sensors 30, 32, 33, and 34 strategically positioned around the RDH document recirculation path of the RDH/SADH 20, as will be further described herein. Additional sensors disclosed here are an SADH/CFF input sensor 36 for documents being inputted into the SADH input 21, and a document exit sensor 38, both also connected to the controller 16. Also provided (optionally) are three document width sensors 31 spaced transversely of the document path to measure the width of the document and thereby control the magnification ratio automatically, as will be described. All of the document path sensors described here are preferably of a commercial photooptical type wherein the entrance or exit of a document sheet through a conventional photo-diode optical path across the document path provides an output signal directly indicative of the passage of the lead edge and/or trail edge of the document past that fixed position at that time, relative to a clock count time in the controller 16, and relative to an encoder count of the transport servo 24 movement encoder.

A document set separator and stack height sensor 40 is connected to the controller 16 to provide conventional signals, i. e. a signal indicative of no documents being present in tray 26, and a signal upon each circulation of the document set (both by dropping of the set separator finger through an aperture in the bottom of the tray 26). The sensor 40 may also provide signals indicative of the approximate height or thickness of the stack of documents 27 in the tray 26, at the time the finger is automatically reset on the top of the stack, which information is utilized to control the air-knife pressure of the VCF feeder 28, as described in U.S. Ser. No. 373,919 filed May 3, 1982 (D/82035) and art cited therein.

Also in the same document recirculation path to and from the RDH tray 26 are plural spaced document sheet feeding roller pairs. Here, these roller pairs preferably include a neoprene rubber or other relatively high friction driven roller and a mating idler roller of smooth stainless steel or the like.

The first specific roller drive provided for the documents in the RDH path here are a take-away roller driver 42 and its mating idler 44. They are slightly downstream of the document exit from the tray, for providing take-away feeding of a document after it has been separated from the stack and initially fed out by the vacuum corrugating feeder 28.

The first sensor 30 detects the lead edge of this document being fed into the nip of these take-away rollers 42 and 44 by the VCF feeder 28. The sensor 30 provides a jam condition check signal if the document is not sensed within a prescribed time window. The take-away rolls 42 and 44 are aligned with, i.e. at a zero degree angle to, the document path, so as to feed the document sheet on through arcuate document guides or baffles 70 of the recirculation path to the next pair of drive rollers 46 and 48 without inducing skew or transverse movement of the document. The deskewing roller driver 48 and its mating deskewing roller idler 46 are illustrated in enlarged detail in FIGS. 2 and 3. They form part of an automatic document side edge registration and deskewing system, as will be further described herein, in which the take-away idler 44 is solenoid retracted away from the take-away driver 42 after the lead edge of a document has entered the nip between the deskewing rollers 46 and 48. That opens the nip between rollers 42 and 44 and thereby releases the document sheet for deskewing and lateral registration control only by the rollers 46 and 48. The vacuum force has been previously removed from the VCF 28, to release the trail edge of the document therefrom. That is done as soon as the document lead edge area is acquired by the take-away rollers 42 and 44.

The acquired document may be temporarily stopped at a "wait" station position before it is transported onto the platen, i. e. briefly wait for the completion of copying of the preceding document already on the platen. Except for the first feed of the first document, the preferable wait station stopping position 88 of a lead edge of the document is slightly beyond the nip of the deskewing rollers 46 and 48. This may be calculated by a timing count initiated by the lead edge of the document passing the first sensor 30. The distance and velocity of the document movement is known, because the respective document driving rollers 42, 48 in the document path are directly driven by servo motor 24, the encoder of which provides the timing count pulses, and the document is always under positive control in at least one document feeder nip.

Once feeding of the document sheet in the wait station 88 is initiated, the lead edge of the document passes the second, registration, sensor 32 slightly upstream of the upstream entrance to the platen transport 22. The sensor 32 is also multi-functional. It looks for the arrival of the lead edge of the document at the appropriate time, as a jam check. Then it looks for the arrival of the trail edge of the document within an appropriate time window (count) for the largest document to be fed from tray 26 to provide a second jam check at that sensor 32 position. Most importantly, the sensing of the trail edge of the document by sensor 32 as it is being fed onto the platen 12 by the platen transport belt 50 of the platen transport 22 initiates a process of calculated timed registration movement to stopping position of the document, as will be further described herein.

On the first feed of the first document to be recirculated there is optionally provided an alternative initial wait station at a set of document width detector switches 31 upstream of the platen 12. The first document fed is held here briefly for calculation of which one of a standard set of document widths in a look-up table in non-volatile memory in controller 16 corresponds to the occlusion of one, two, or all three of these sensors 31. The positions of sensors 31 are spaced transversely across the document path so that, for example, documents of standard U.S. letter size will occlude only one sensor 31, documents of thirteen inch length will occlude two sensors 31 but not the third sensor 31 and documents of fourteen inches or greater length will occlude all three sensors 31. The three sensors 31 are connected to controller 16 to provide the document size from the look-up table, and/or to directly control the optics system 14 to provide a suitable image reduction of that size document to fit onto the selected size of copy sheet available (automatic "force-fitting").

The platen transport belt 50 is preferably a single wide white uniformly light reflective belt of a conventional high friction material. The belt 50 provides, together with the illustrated backing pressure rollers for increasing the normal forces, feeding of each document without slippage onto and across the platen 12 into registration. After copying the belt drive motor 24 restarts to eject that document while feeding on the next document. The belt 50 is driven through one of its two end rollers by a direct driving connection (schematically illustrated by connecting line 52), through an automatically electrical engaged clutch, to the servo motor 24. The servo motor 24 has a rotational encoder, preferably a conventional integral shaft encoder. This encoder provides encoder count signals (pulses) to the controller 16 cumulatively directly indicative of the amount of rotation of the servo motor 24 and therefore the corresponding movement thereby of the transport belt 50. The transport belt 50 is slowed down and temporarily stopped for the imaging of the document at a desired belt movement distance along the platen when a predetermined desired count of such servo encoder 24 output pulses to the controller 16 has been reached, by count comparison, as will be further described. Immediately following copying the servo motor 24 is restarted in the same direction to transport documents unidirectionally with belt 50 for ejection from the opposite end of the platen from which the documents enter, and for simultaneously feeding in the next document.

The exiting document passes a third jam sensor 33 adjacent the downstream platen edge. This sensor 33 also forms part of a system for inverting duplex documents here, as will be described.

Documents which are not being either inverted, or ejected from the document handler, e.g. simplex documents being recirculated back to the tray 26, are fed on directly to return transport roller pairs 54 via baffles 78. Rollers 54 in turn feed the document on to restack roller pairs 56, which provide document corrugation and ejection of the document back on top of the stack of documents in the tray 26.

Alternatively, for either document ejection or document inversion, documents fed off platen 12 by belt 50 are diverted by a solenoid actuated diverter gate 58 (in its dashed-line position) into a first set of exit roller pairs 59. Then the document is fed through a one-way gravity inverter gate 60. The gravity inverter gate 60 is deflected upwardly into its illustrated dashed-line position by the lead edge of a document fed therein by the rollers 59. After the trail edge of the document passes the gate 60, the gate 60 drops by gravity force downwardly into its solid-line position.

For document inversion the document sheet movement direction is then reversed after the document is well past the gate 60 and gate 60 has dropped. Reversing a (recirculating duplex) document for such inversion is accomplished by reversing the direction of rotation of independently and reversibly driven exit rollers 62 downstream of the gate 60. The reversedriven document is deflected upwardly by gate 60 into a different (reversed document) path extending into the rollers 54 for restacking in tray 26 with inversion. The sheet guides and baffling illustrated provides a generally "Y" shaped inverter path for the documents being inverted with a generally horizontal portion forming the base of the "Y". Note however, that only a portion of a normal inverting chute is provided by this portion 61. For normal size documents, at the time they are reversed by reversal of rollers 62 only a portion of the document is in this horizontal partial chute 61, while the rest of the document (approximately half) is extending out beyond both rollers 62 and the end of the chute 61. Both rollers 61 and exit sensor 38 are adjacent the open end of partial chute 61.

The timing of the reversal of roller pairs 62 for each sheet being inverted in preferably a count in controller 16 initiated from the sensing of the trail edge of that document at sensor 33. That is, a count in servo encoder pulses providing sufficient travel for the trail edge of the document to be transported from sensor 33 past inverter gate 60. That time count is also sufficient for the document to have been fully, centrally, acquired by rollers 62 before the rotation of rollers 62 is reversed. The rollers 62 are located closer to gate 60 than the movement dimension of the smallest document to be inverted, preferably less than approximately half the dimensions of a normal (e.g. 8½" wide) document.

Alternatively, but less desirably, the lead edge of a document may be sensed at exit sensor 38 to initiate after a count the reversal of rollers 62. In either case, the inverter timing count is from the servo motor 24 encoder, since the document movement corresponds thereto, because of the non-slip drive of the document by belt 50 and rollers 59, which are both driven by servo motor 24.

Rollers 62 are preferably driven by a separate small reversible AC motor. However, for insuring uniform speed drive, especially for CFF web, the rollers 62 are preferably clutched into the servo motor 24 drive system for SADH input 21.

The inverter system described above alternatively provides for document ejection of documents not being circulated (not being returned to tray 26). For such non-recirculating document feeding and copying with the RDH/SADH 20, documents may be inserted at the SADH input 21 and fed in through the nip formed by an SADH roller driver 64 and mating idler 66. The idler 66 may be solenoid cammed down away from the driver 64 for document insertion. During insertion and initial registration on adjacent SADH gate 68 is solenoid actuated into the document path for the SADH entrance 21 (only). When the controller 16 initiates SADH feeding, by sensing SADH input at sensor 36, the SADH input gate 68 is moved out of the SADH document path and simultaneously idler 66 is lifted into driving engagement with the driver roller 64 to feed the document towards the same platen transport 22 for copying. The SADH document input path merges into the RDH input path via integral baffling. As the document is fed off the platen the gate 58 is raised automatically in response to said SADH input. SADH documents are fed out by rollers 59 and 62 and ejected rather than being inverted. The rollers 62 are *not* reversed for SADH input. For SADH the rollers 68 provide for document ejection, rather than inversion. Likewise, the horizontal portion 61 of the "Y" path of the inverter baffles in which rollers 62 are located provides an initial partial output path or chute for documents in this mode, rather than an inverter chute, i.e. all those sheets or web fed into the SADH input 21 are fed completely out past exit sensor 38 using the inverter system.

In the recirculating document copying (RDH) mode of operation of the document handler 20 all documents 27 fed from the stack 26 are initially inverted once, and deskewed, in hemi-cylindrical first inversion baffles 70. These baffles 70 here include at one side or edge a corresponding large radius curved edge registration guide 72, illustrated in enlarged cross-section in FIG. 2. The guide 72 is preferably a single clear plastic molding containing an integral arcuate (hemi-cylindrical) slot 74 and a linear SADH input slot intersecting into a common base slot leading to the platen. The arcuate slot 74 has smooth generally parallel sides closely spaced from one another, (preferably substantially less than one centimeter) but spaced apart by a distance substantially greater than the thickness of the thickest document to be fed. A suitable such slot width is approximately 2.5 mm, measured perpendicular to the document plane. The slot 74 depth to its bottom 76 is preferably greater. Approximately 15 mm has been found suitable. The bottom 76 of the slot 74 provides a smooth, low friction, surface against which one edge of each document sheet is deskewed and side-registered and slides along as it is being fed by deskewing rollers 48 and 46 through the arcuate baffles 70. That is, as the document is being fed away from the stack bottom feeder 28 to the nip between the platen 12 and the platen transport belt 50. The strict document control provided by the continuous confinement of the edge of the document being deskewed and side registered inside the slot 74 enables this to be done even though the document is being highly deformed while this is being done.

With this system, each document sheet is accurately side-registered only just before it is fed onto the platen 12, and each time it is circulated. The document cannot skew or deregister before being immediately acquired by the non-slip platen transport. No on-platen side registration, or downstream side registration, or accurate restack registration is required, which is highly advantageous, as previously described. Likewise, all deskewing is accomplished in this same step, and lead edge deskewing is not required anywhere in this system. The other transport rollers 42, 44; 54, 56, 59 and 62 need only provide for linear, non-skewing, feeding so as not to induce uncorrectably gross side misregistration or skewing in the recirculation process. Since the platen transport 22 does not allow slippage of the document relative thereto, the upstream side registration and deskewing provided in this system is strictly maintained as the document is transported across the platen by the belt 50 into the desired registration position. As noted, such a non-slip platen transport system is practical only with upstream deskewing of the document. Conventional on-platen deskewing against a mechanical registration edge is not practicable with a non-slip platen transport.

A conventional second set of inversion baffles 78 between the platen 12 and restack rollers 56 provides the second turn-over of a document being returned to tray 26. The baffles 78 are integral to and form the ends of the two upper branches of the "Y" inverter path described above in operational communication with the partial baffles 61. The baffles 78, 61 and all other baffles in the DH 20 other than 70 do not have edge guides and therefore do not have any document edge drag. Likewise, the restacking side guides (not illustrated here) in the tray 26 can be sufficiently widely spaced so as not to have any frictional or other resistance to restacking, because in this system these side guides are not providing the fine or final edge registration and deskewing for the documents, merely gross positional restacking.

Figure 2:
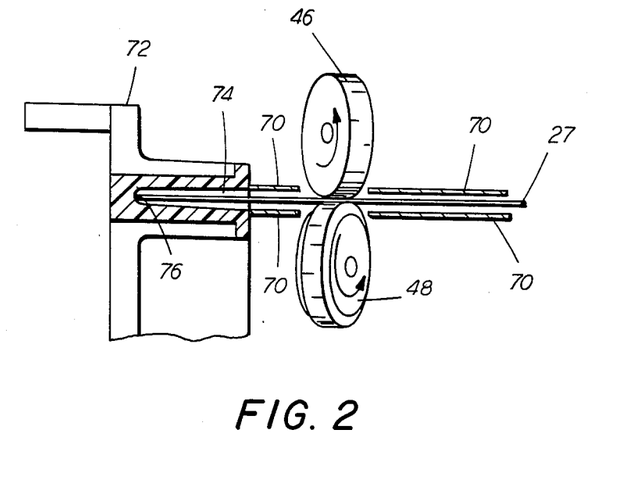
FIG. 2 is an enlarged and partially cross-sectional view of a portion of the RDH/SADH of FIG. 1 relating to the document side registration and deskewing system.
Figure 3:
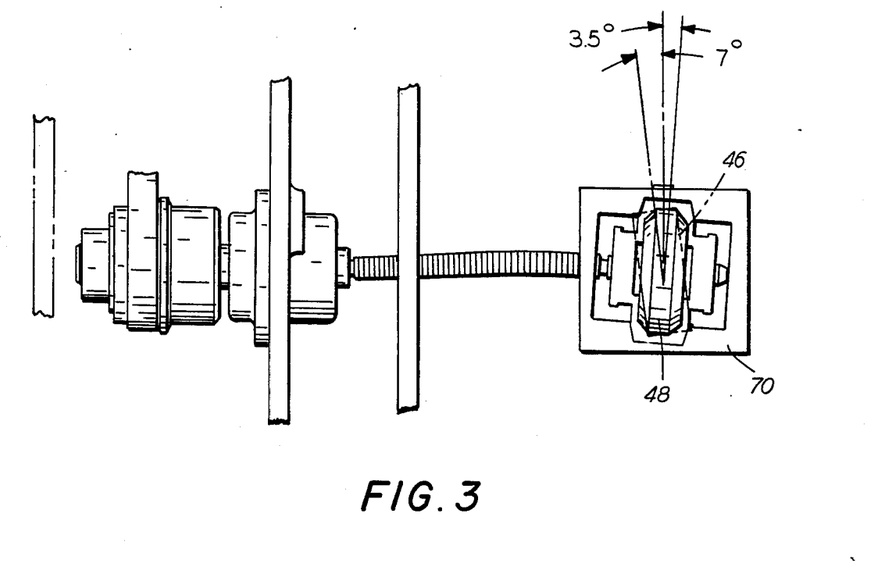
FIG. 3 is another partial detail view of the side registration and deskewing roller system of FIG. 2 and its drive.

Discussing further this upstream side registration and deskewing system disclosed herein, as shown particularly in FIGS. 2 and 3, and a further discussed in the above-cited U.S. Pat. No. 4,179,117, an appropriate limited sideways or lateral vector force component is induced in the document sheet by the different friction and oppositely skewed rollers 46 and 48. Here, the high friction driving roller 48 is preferably at an angle of approximately 3½ degrees toward the document side edge registration wall (the slot 74 bottom 76 in the edge guide 72). The opposing smooth low friction idler roller 46 is here skewed in the opposite direction, away from the edge guide 72, by approximately 7°. The lateral vector force component of wheel 48 continuously urges the edge of the document fully into the slot 74 until it is fully abutting the slot bottom 76, which edge registers and deskews that document sheet. The opposing skew roller 46 then assists the resistance of the slot bottom 76 to further attempted lateral document movement force by rollers 48. The slot bottom 76 is parallel the primary direction of document motion.

Most importantly, because slot 74 and the rest of baffles 70 are continuously arcuate, the document is likewise arcuately curved therein. This provides high beam strength. That is, deskewing and side registration is driven by rollers 46 and 48 at an intermediate area in which the document sheet beam strength has been maximized by the document being highly curved into a closely controlled semi-cylindrical configuration, which very greatly increases the resistance of the document sheet to wrinkling or buckling (and therefore jamming) during this edge registration and deskewing process. The close spacing of the opposite sides of the slot 74 prevents even flimsy sheets from wrinkling, waving or buckling from the forces deskewing them.

With this system, deskewing and side registration are provided with a maximum stiffness or strength of the document sheet, and can be provided for documents too thin and flimsy for deskewing and side registration in a normal planar configuration. This type of document is easily damaged by conventional lead edge registration deskewing. Thus, the present system increases the latitude and reliability of document feeding in a "soft-stop" or non-mechanical and non-deskewing platen transport registration system, and enables the latter to be utilized effectively by feeding pre-deskewed documents directly thereto even if they are very lightweight, flimsy sheets.

As noted above, the take-away roller idler 44 is raised automatically by a solenoid or cam as soon as the document is under the control of the deskewing rollers 46 and 48. This releases the trailing area of the document from rollers 46 and 48 and therefore from any lateral resistance or impediment by any transports to side registration and deskewing by the rollers 46 and 48. Thus, as soon as, and as long as, the document sheet feeds through the rollers 46 and 48, they continuously maintain a constant urging of the document edge against the slot bottom 76. The document edge slides freely in slot 74 because the edge guide 72 (preferably a monolithic molding) provides a continuous slot 74 with smooth surfaces all extending continuously from the outlet of the stack feeder 28 to the inlet of the platen transport 22. Also, the slot 74 and the rest of the baffles 70 have a large radius (greater than approximately 5 cm.) and are not skewed. The two inputs to the slot 74 preferably have smoothly flared (wider) openings to guide documents therein.

Additional time is provided for this separating of the nip between the initial or take-away roller 42 and 44 by a normal pause in the feeding of the document sheet just after the lead edge thereof has passed through the rollers 46 and 48. Reference numeral 88 is indicative of this normal wait station of the leading edge of the document. This pause may be very brief, or entirely eliminated, e.g. for the first document and for an initial non-copying (counting) "slew cycle" circulation of the documents. However, this pause may be substantial in the case of a second and subsequent documents being copied. These subsequent documents are stopped when their lead edge reaches the wait station 88 while the previous document is being copied on the platen 12, by stopping rollers 48.

Another, separate, and different deskewing and side registration system is provided for the SADH input 21. As particularly shown in the bottom view of FIG. 4, the idler roller 66 for this input is also skewed at 7° away from the side edge guide. However, here the high friction driving roller 64 is angled at approximately 7° toward the side edge guide. The side edge guide is an integral extension of the guide 72, providing a separate but intersecting branch of the same size and shape as slot 76 and having a bottom coplanar with slot bottom 76. The wait station for documents being presented to this SADH input 21 is at the SADH gate 68. Documents from the two wait stations 68 and 88 are fed on equivalently short paths into a common position at the entrance to the transport 22. However, since these two wait stations are separate and non-interfering with one another, documents may be fed to be copied from either wait station or alternately upon command without time delay (copier pitch loss). The presence of a document at the SADH mode sensor 36 provides a signal which may be utilized to automatically rapidly interrupt the feeding of documents from the RDH tray 26 even if feeding therefrom is in process, i.e. even if a document is already at wait station 88 in the RDH mode. Thus, copying interruption time for changing between copying modes is eliminated or minimized. Since the duplex document inversion system 58, 59, 60, 62 is at the opposite side of the platen from the SADH input 21 they do not interfere with each other either. In fact, as noted, they cooperate, by sharing the same output/inverter path and gate 58 and drives 59 and 62 and sensor 38.

Figure 4:
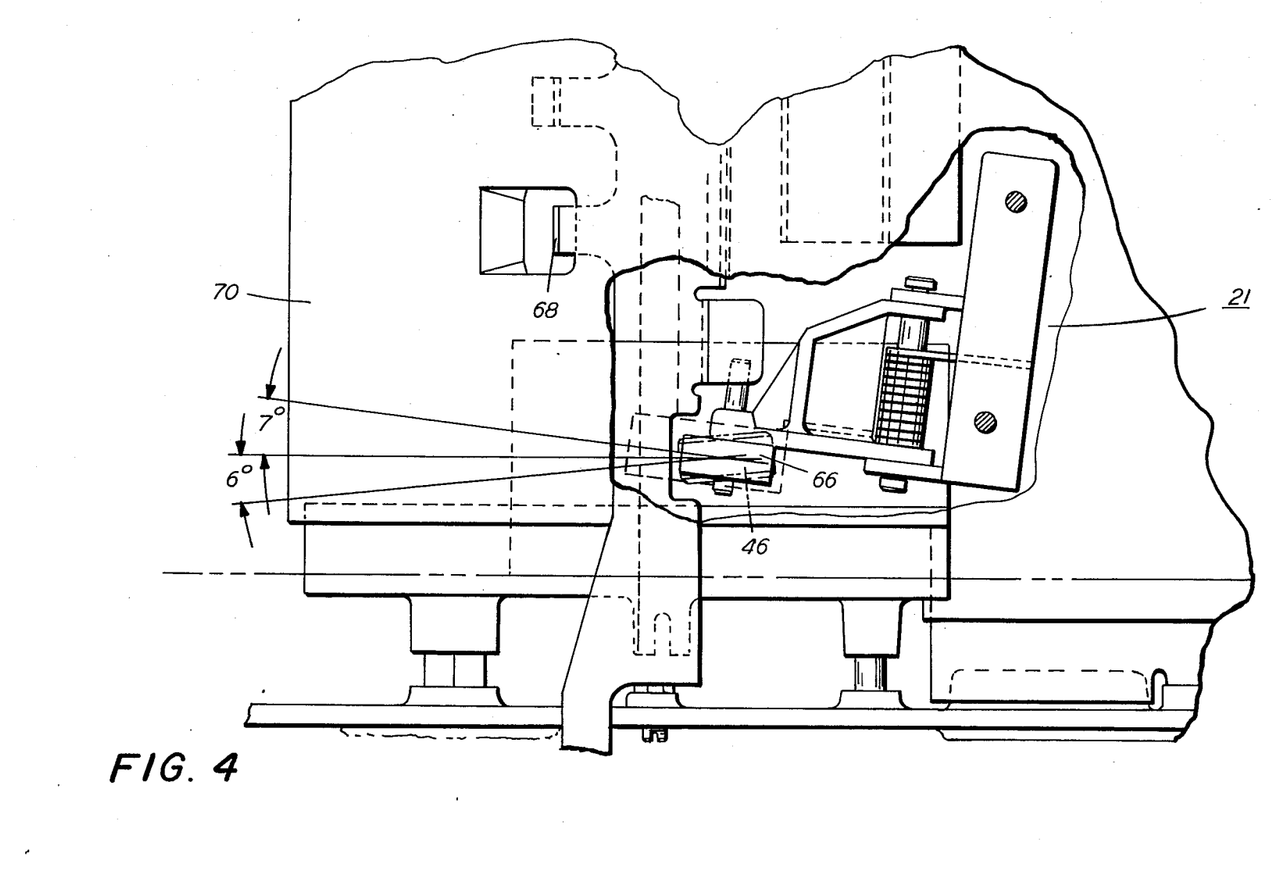
FIG. 4 is an enlarged partial bottom view of another side registration and deskewing roller system for the SADH document input of FIG. 1.

Deskewing by the SADH input rollers 64, 66 occurs continuously, both as the document is inserted into the gate 68 and also after the gate 68 is opened and the document is being fed to the bottom transport 22.

It will be noted that, unconventionally, the document input (preplaten or fed and deskewing) rollers 46, 48 and 64, 66, are single roller pairs acting along one edge of the document sheets, rather than a plurality of rollers extending across the document sheet. That is, the transporting, deskewing and side registering of the document sheets from their input to the platen is done by gripping the documents only adjacent one side edge thereof by small frictional rollers, rather than by conventionally utilizing plural or elongated rollers extending transversely across the sheet transversely to its feeding direction.

The following discussion relates to further details of the registration of the document sheets for copying on their other or diagonal axis, i.e. registration of the lead edge of the document in its direction of movement. This is accomplished here on the platen by the controlled stopping position of servo-motor drive 24, as controlled by the controller 16 utilizing the integral encoder pulse output of the servo motor 24. A variable registration control system is provided utilizing the control of servo-motor 24 for controlling the document to stop at a desired calculated stopping position. An example of such a calculated actual registration position of the lead edge of a document is illustrated at 92. This actual document stopping position 92 is calculated relative to a preselected ideal registration position for the lead edge of the document. Here this desired or ideal position is closely adjacent the downstream edge of the platen, and is illustrated at 90. However it could be elsewhere on the platen. Note that the platen 12 here is much larger than the normal actual or active image area thereof. The latter is the actual document size divided by the magnification ratio, i.e. the actual image area "seen" by the copier optics 14 is increased by the degree of optical reduction. The document is desirably placed accurately within this active image area of the platen with the downstream edge of the document at "registration", i.e. at the downstream edge of the active image area, wherever that may be on the platen.

Note that with this system the downstream or leading edge of the document is preferably registered automatically at a variable position 92 normally but not necessarily adjacent the downstream edge of the platen. However, in this system the calculation for registration is based upon and initiated by the sensing of the passage of the *trail* edge of the document at sensor 32 before the trail edge of the document was fed onto the *upstream* edge of the platen. The latter is desirable because it occurs after the rest of that document has been securely acquired and is in non-slip transporting engagement with the platen transport 22, i.e. after almost all of the document is held between the lower flight of the belt 50 and the platen 12. This lower flight of belt 50 is pressed against the document by plural backing rollers to prevent any document slip or skewing.

Registration here is the position and time at which the document is stopped. Alternatively, it could be the point in time at which the illumination optics are flashed, if full frame rapid flash illumination is available in the copier. In the latter case the document transport would not need to actually stop, i.e., the document would be only optically "stopped" by taking its image rapidly at the calculated registration position.

The document is registered at its proper desired imaging position on the platen by detecting the trail edge of the document and then counting (clocking) electrical pulses generated by the document feeder 22, which is feeding the document across the platen, until they reach a pre-calculated desired count from that point in time, to initially a measured stop. The servo drive 24 encoder provides an accurate pulse count corresponding directly to the movement of the transport 22. The platen transport 22 here is driven unidirectionally at all times, so there are no backlash or tensioning errors between the drive 24 and the actual movement of the belt 50. The copier controller 16 begins a count of the encoder output of the servo motor 24 towards registration upon the actuation of the sensor 32 by the trail edge of the document. From the relative timing of the document in the cycle and the clearance of the document past the sensor 30 or 36 at that point in time, and/or the prior lead edge signal from that document at sensor 32, the controller 16 knows that it is the document trail edge it is sensing at 32 at that time and not the lead edge. The sensing of the document trail edge initiates the count-down to the measured registration stopping position of the document transport. As noted above, the encoder pulse count to which that count-down must reach is based on a prior computation in the controller 16 combining input information as to both the copy paper size and the selected magnification or reduction ratio at which the document image is to be magnified or reduced in copying onto the copy sheet.

That is, this system stops the document drive 22 in response to the calculation of where the document should ideally be stopped on the platen as a function of both the selected or measured copy size and a selected or measured magnification/reduction ratio. The magnification ratio is, of course, a function of the position of the mirrors and lenses and conjugates between the platen 12 and the photoreceptor of the copier, as is well known in the art. However, as indicated above, the selected reduction or magnification ratio utilized as an input to the controller 16 for the present system may be from either or both of two inputs, the switch selection (the ratio selector switch 17 or dial and display on the copier console) and/or the lens or mirror position encoder 15 sensing the resulting actual position of the optical components. Thus, for example, if the operator selects a "normal" or 1 to 1.01 (slight overfill) copying ratio with that switch 17, that information is inputted to the controller 16 for the registration calculation here, and also to normally cause the optics 14 to assume the correct position for that magnification ratio, and the optics encoder 15 will then provide a confirmatory signal thereof to the controller 16 of that same magnification ratio.

The other preliminary input to the registration position computation for the encoder count-down value is a signal corresponding to the copy paper size. That information may also be inputted directly from the console copy tray selector at a selected switch 18, and/or from copy sheet size sensors. Here these may be sensors in the paper path or in the copy sheet trays conventionally providing indications of the paper size. Those signals may be restricted or converted to a limited number of "standard" paper sizes for a particular copier and country of use. The buttons 18 may be preset to select one of those local standard sizes. That is, to provide a paper size of "PS" signal which is a selected one of a limited number of sets of precalculated signals respectively corresponding to a preselected limited number of paper sizes which have been stored in the non-volatile memory of the copier. These are converted by the controller 16 to their corresponding dimensions, in the registration movement direction, in servo 24 encoder counts equivalents of those dimensions, i.e. as if the copy sheets were being transported by the platen transport drive 22 by that same distance.

As indicated, alternatively or additionally to simply inputting the paper size selection from switches 18, copy size sensors may be provided as schematically illustrated in the lower right-hand side of FIG. 1, associated with the paper trays shown there, or located elsewhere in the paper path. Actuation of a particular sensor or sensors along a spaced line of plural sensors indicates paper of that approximate dimension. The connecting controller 16 then preferably retrieves from a table or store in its non-volatile memory a signal, in corresponding encoder counts, corresponding to the closest copy sheet size which would actuate that copy sheet sensor and would fit in the particular tray in which that sensor is located and/or from which copy tray feeding has been selected. This converts the sensing of an approximate copy sheet size with the sensors to a standardized or exact copy size output signal in encoder counts.

Alternatively, particularly if the copier is of the type utilizing separate dedicated copy paper trays or removable cassettes for specific sizes of copy sheets, the controller 16 will automatically assume that the insertion of a particular tray in the copier, or the selection of one selector switch 18 for a particular tray, implies the feeding therefrom of only one particular standard size copy sheet, and automatically provides an encoder count signal corresponding thereto for the registration calculation from a conventional table, conventionally programmed in its non-volatile memory.

As indicated, the document drive 22 is stopped to stop the document at the desired registration position in response to a calculation combining these input signals, in encoder counts, corresponding to both the copy size and the magnification or reduction ratio. This combined calculation provides a servo encoder count which tells the servo drive 24 precisely how far it is to be driven from the time the document trail edge is detected by the sensor 32. This calculation provides information in advance of said stopping of where the document transport is to be stopped. Therefore it is utilized to provide a preprogrammed controlled deceleration (slowdown) stop of the servo 24 rather than a hard stop. A hard stop could cause slippage of the document relative to the belt. As noted, the document is registered solely by the controlled stoppage of the transport 22 in the desired registration position. The document is not stopped by any registration gates, fingers or other mechanical stops, and does not stop relative to belt 50.

Although the stopping position varies in accordance with the copy paper size and image reduction/magnification, other positional criteria may be added thereto. That particularly includes the desirable optional addition of a programmable margin shift. That is, an additional input for shifting of the stopping position of the document on the platen by an additional preselected distance from the calculated stopping position so as to correspondingly shift the position of the document image on the copy sheet to provide a corresponding change in the edge margin of the copy sheet. That is particularly useful for assuring an adequate left side margin for binding of the second side of a duplexed copy sheet. This additional registration shift for a margin change or otherwise can be provided simply by another illustrated switch or knob selection on the console input to the controller 16 to add or subtract a selected margin shift. This switch actuation tells the controller 16 to add a number of servo encoder counts to the count-down calculation corresponding to the selected additional movement of the platen transport 22 before it stops for copying, e.g., to add up to plus or minus 13 millimeters of further transport 22 movement.

The specific calculation for registration stoppage of the transport 22 here may desirably be done by an equation which corresponds to the expression "REG=-DIST−(PS/MAG)+SHIFT". In this expression of the countdown calculation, REG is the calculated total number of servo 24 encoder counts by which the document transport 22 is to be driven after trail edge sensing. That is, the transport 22 will be stopped by controller 16 when the number of encoder pulses from the servo 24 accumulated after the actuation of sensor 32 reaches this calculated count. The DIST in this equation is a constant. It is a preset number of servo encoder counts, corresponding to a desired distance in servo encoder counts between sensing means 32 and a preselected ideal registration position 90 where the lead edge of the document would be adjacent the downstream edge of a platen, calculated for a document having a conventional or known dimension in its feeding direction. PS is the selected paper size in servo encoder counts as discussed above. Said PS is divided by MAG, which is the selected magnification or reduction ratio. SHIFT is the optional portion of this calculation, as discussed above. It is the selected shift in the stopping position in servo encoder counts for varying the copy margins, assuming any said shift is selected. If no shift is selected this component becomes zero and drops out of the formula.

Note that DIST can be preset to accommodate the actual position of the sensor 32 at whatever distance upstream of the registration position it is desired to position this sensor. Likewise, DIST can be changed to accommodate different size platens or different desired registration positions on the photoreceptor or to accommodate different copy sheet registration systems. A technical representative may electronically adjust the copier document registration to fit the particular mechanical tolerances or variations of that particular copier simply by changing this DIST count in the non-volatile memory fo the copier. This is an advantage over conventional copiers which require mechanical adjustments in one or more of the mechanical elements affecting mechanical registration, and may require special alignment tools or the like. Manufacturing may also be simplified in this manner. The electronic change in the stored encoder counts can be tested immediately on test copies of a marked test document to confirm proper registration.

Additional calculations or controls and/or imposed limitations on the operation of the above-described calculated registration system may be provided. In particular, the registration calculation may further desirably include insuring that the document is stopped for copying in a position where it is fully overlying the platen and not extending therefrom, irrespective of the magnitude of the PS or MAG or SHIFT signals, by presetting maximum and/or minimum REG counts for the particular copier.

Specifically, the system may be programmed to indicate whenever the lead edge of the document has stopped, or will be stopped, beyond the downstream edge of the platen, and therefore cannot be fully imaged. This could be provided by actuation of the downstream sensor 33 by the document lead edge prior to or during copying. However, this feature is preferably, and more accurately, provided by having in a non-volatile memory the encoder count corresponding to the total available distance between sensor 32 and the downstream edge of the platen (or the distance from the preselected registration point 90 or DIST count to the downstream edge of the platen). When the above-described formula provides a REG count which exceeds that downstream platen edge count, a signal may be flashed on the operator console by the controller 16 and/or copying may be inhibited. Alternatively and preferably in this situation the document may be stopped at the servo encoder count corresponding to the document lead edge being at the downstream edge of the platen even though REG exceeds that count, i.e. providing an alternative (maximum travel) stopping position. Alternatively or additionally the optical ratio or paper size may be automatically changed.

There is a further, additional (and in some cases interrelated) feature which may be provided. This is to provide an operator indication or control in the opposite situation, i.e. when the calculated REG count is so small that the platen transport 22 will not have driven that document a sufficient distance for the trail edge of that document to have been fed all the way onto the platen when the document feeder 22 is stopped in the normally calculated REG count stopping position. This failure of the trail edge of the document to be on the platen at the calculated stopping position for the lead edge thereof may be provided by sensing the continued presence of a trail edge area of the document at the sensor 32 before or during copying. However, preferably this information is provided by comparing the calculated REG to a preset minimum allowable REG count which is the encoder count of the document path distance from sensor 32 to the platen. The calculation of a REG which is less than this minimum in the above formula indicates to the controller 16 that the trail edge would not be driven by the distance from the sensor 32 to the platen. As with the previously described downstream problem, this may be signaled to the operator to tell the operator to make another selection in paper size or magnification ratio which will eliminate this problem. Alternatively, that may be done automatically, as by automatically changing the selected paper tray and/or automatically changing the selected magnification ratio for that document until an acceptable recalculated REG count is reached. That is, to require REG to exceed a preset minimum count in all cases to assure that the trail edge of the document will always reach the platen before copying. If this change, or an oversize document, would also or then cause the lead edge of that same document to have a calculated REG stopping position beyond the downstream edge of the platen, then the additional feature described above for that other problem may automatically come into play also. The controller can be programmed to prevent copying them or to make a choice as to which end of the document will not be on the platen.

A further optional feature which may be compatibly provided is to additionally measure or calculate the actual dimensions of the document being copied in its feeding direction and to utilize that information as well. Document length (transverse dimension) may be calculated with sensors 31 as described above. This may also be provided by for the other dimension of the document for example detecting the lead edge of the document at sensor 32 and counting the servo encoder pulses required to transport that document from then until the sensing of the trail edge of that document at sensor 32. (There may be some error due to velocity variations until the document is under full control of the platen transport belt.) This document dimension in servo 24 encoder counts may be compared to the calculated REG. It may be used, for example, to anticipate that that document width, for that particular selected copy size and magnification ratio, would cause that document's lead edge to be stopped downstream of the downstream platen edge, and even to avoid this automatically by automatically changing the magnification ratio and/or copy sheet size.

While the embodiments disclosed herein are preferred, it will be appreciated that they are merely examples, and that various alternatives, modifications, variations or improvements may be made by those skilled in the art from this teaching, which are intended to be encompassed by the following or subsequent claims:

What is claimed is:

1. In a document feeder for feeding a thin, flimsy, document sheet in a document feeding path downstream to a registered copying position on the platen of a copier, with document deskewing and document lateral edge registration transverse the direction of the document feeding path to the platen and upstream of the platen with skewed roller edge registration means for feeding the document both transversely and downstream, and wherein large radius non-skewed arcuate document guide path means provide arcuate document deforming in the direction of said document feeding path to the platen and document inverting, the improvement wherein:

arcuate document edge confinement and control means are provided along one lateral edge of said arcuate document guide path means, said skewed roller edge registration means is mounted in and intermediately of said arcuate document guide path means for providing both lateral edge registration and deskewing of a document therein by transverse movement of the document into alignment with said document edge confinement and control means while the document is arcuately deformed in both said arcuate document guide path means and said document edge confinement and control means, and document feeding means are provided for feeding the document into said arcuate document guide path means and into said skewed roller edge registration means, said document feeding means includes means for releasing the document for preventing interference with said transverse movement of the document by said skewed roller edge registration means, wherein said arcuate document edge confinement and control means comprises a document edge guide having a narrow arcuate slot having a smooth bottom extending along said lateral edge and correspondingly arcuately to said arcuate document deforming, said arcuate slot being adapted to receive, confine closely and uniformly arcuately, and edge register therein, along said bottom of said slot, said one lateral edge of the document, and wherein said skewed roller edge registration means is positioned closely adjacent said slot bottom and adapted to laterally feed said one lateral edge of the document transversely fully into said slot while also feeding the document downstream arcuately in said slot slidably along said slot bottom for said document lateral edge registration and deskewing.

2. The document feeder of claim 1 wherein said document feeding means comprises at least one normally closed document feed roller pair nip upstream of said arcuate document guide path means, and wherein said means for preventing interference comprises means for automatically opening said nip after a document fed thereby has been fed into said skewed roller document edge registration means, said document feeding means being adapted to only partially feed the document into said edge confinement and control means.

3. The document feeder of claim 1 wherein said skewed roller edge registration means comprises a relatively high friction rotatably driven roller mounted adjacent one edge of said document path and skewed at a small angle towards said edge and a low friction roller forming a document feeding nip with said high friction roller and skewed away from said edge.

4. The document feeder of claim 1 wherein said slot is generally hemi-cylindrical and has a width perpendicular said document feeding path of less than approximately one-half centimeter.

5. The document feeder of claim 2 wherein said document feeding means provides non-skewing downstream feeding of a document without transverse feeding.

6. The document feeder of claim 5 wherein said document feeding means comprises at least one normally closed document feed roller pair nip upstream of said arcuate document guide path means, and wherein said means for preventing interference comprises means for automatically opening said nip after a document fed thereby has been fed into said skewed roller document edge registration means, said document feeding means being adapted to only partially feed the document into said edge confinement and control means, and wherein said document feeding means provides non-skewing downstream feeding of a document without transverse feeding.

* * * * *